Aug. 4, 1942.  C. H. SCOTT  2,291,836
RAKE LIFTING DEVICE IN THICKENERS
Filed Aug. 7, 1940  6 Sheets-Sheet 1

INVENTOR
CHARLES H. SCOTT,
BY Austin Middleton
ATTORNEY.

Aug. 4, 1942.  C. H. SCOTT  2,291,836
RAKE LIFTING DEVICE IN THICKENERS
Filed Aug. 7, 1940  6 Sheets-Sheet 3

INVENTOR
CHARLES H. SCOTT,
BY
ATTORNEY.

Aug. 4, 1942.  C. H. SCOTT  2,291,836
RAKE LIFTING DEVICE IN THICKENERS
Filed Aug. 7, 1940  6 Sheets-Sheet 5

FIG.12.

INVENTOR
CHARLES H. SCOTT,
BY Austin Middleton
ATTORNEY.

Aug. 4, 1942.  C. H. SCOTT  2,291,836
RAKE LIFTING DEVICE IN THICKENERS
Filed Aug. 7, 1940   6 Sheets-Sheet 6

INVENTOR.
CHARLES H. SCOTT,
BY
ATTORNEY.

Patented Aug. 4, 1942

2,291,836

UNITED STATES PATENT OFFICE 2,291,836

RAKE LIFTING DEVICE IN THICKENERS

Charles H. Scott, Westport, Conn., assignor to The Dorr Company, Inc., New York, N. Y., a corporation of Delaware Application August 7, 1940, Serial No. 351,730

10 Claims. (Cl. 210—55)

This invention relates to thickeners having sediment collecting mechanism, and more in particular it relates to automatic means or control mechanism for safeguarding the machine against ill effects from overload on the sludge impelling elements.

In machines of this type it has been known to provide automatic means for stopping the mechanism or for cutting the driving power or for setting off an alarm in response to certain overload. It has also been known to provide manually controlled rake lifting means whereby the central rotary rake shaft of this raking mechanism could be jacked up or screwed up in order to relieve the overload condition.

It is among the objects of this invention to provide simple, compact, practical and reliable means to effect positive controlled automatic lifting of the sludge impelling elements in response to overload; to initiate an automatic and controlled cycle of lifting and lowering the raking means during temporary stoppage of the raking means as caused by overload.

Another object is to provide automatic and positive control to the effect that a total amount of rake lift in response to overload, is substantially not larger than required by the particular overload or obstacle encountered by the raking mechanism.

Another object is to use but one drive motor for a dual task, namely, for normal operation of the raking mechanism as well as for rake lifting in case of overload emergency, the function of each task being automatically initiated as well as terminated.

To attain these objects, according to the invention, an overload will automatically cause the drive connection between the motor and the raking means to be interrupted, and a drive connection between the motor and a rake lifting device to be temporarily substituted. Otherwise expressed, in case of automatic stoppage of the raking mechanism due to overload, the drive motor thereof temporarily and automatically assumes the duty for a controlled rake lifting operation.

In more specific terms, the above objects are attained by providing for automatic reversal of the motor incident to the disconnection thereof from the raking means, such reversal in turn to initiate the operation of the rake lifting cycle.

To this end there is provided a one-way driving connection between the motor and the raking means, to be effective only when the motor runs in its normal driving direction; and a one-way branch driving connection or branch gear train between the motor and the rake lifting means, to be effective only when the motor runs in reverse. In this way the two driving connections will operate in alternation only, depending upon the direction of rotation of the motor. Suitable automatic switch means determine the lifting cycle, permitting the same to repeat itself in a manner to cause cumulative or step-wise rake lifting as long as overload effects are present to furnish the stimulus for each such cycle.

According to one feature the drive motor when running in one direction is geared so as to rotate the raking means in their normal operation, and when running in the opposite direction is geared up to actuate the rake lifting means. Axial overload thrust of a motor driven worm which in turn drives the raking means, causes reversal of the motor and consequent disconnection of the motor from the raking means. The motor in reverse picks up driving connection with the rake lifting means.

Other features have to do with the organization of the control mechanism for rake lifting, the general function of which is as follows:

A threaded member or nut is operable for lifting and lowering of the raking means, that is to say, of the vertical rake shaft. Normally the nut is free to rotate with the raking means, since its driving connection with the motor is interrupted during the time that the raking means are being driven in normal operation. Overload on the sludge collecting elements, however, will reverse the motor and also interrupt the driving connection thereof with the raking means. Consequently, the motor in reverse is free to pick up the drive connection to the nut for rotating the same, causing the rake shaft to be lifted until it reaches a limit, such as a time limit switch, at which the motor again is automatically reversed. This means that the drive connection between the motor and the raking means is re-established, while the drive connection to the nut in turn becomes interrupted, and the nut moreover becomes locked so as to permit the raking means to be lowered again as normal driving connection is being resumed. As the raking shaft again reaches its lower position, the nut becomes unlocked, that is to say, rotatable together with the raking means.

Consequently, some features have to do with providing a branch drive connection or branch gear train adapted for one-way transmission of power between the motor and the rake lifting device or actuating nut, and also providing means for automatically interrupting or restoring that gear train, depending upon whether the motor is running in the normal direction or in reverse. Hence, a feature deals with a gear train between motor and actuating nut, having a gear element which is shiftable into and out of driving engagement with the gear train, the shifting movement of which gear is automatically controlled by and incident to a change in the running direction of the motor.

According to another feature the branch gear train just mentioned has associated with it what may herein be termed as an "escapement device" comprising something similar to a pawl and ratchet device for locking or releasing the actuating nut automatically and in a manner to realize the rake lifting cycle outlined above. Certain required settings of the "escapement device" are established automatically under the influence on the one hand of the vertical movement of the rake shaft, and on the other hand under the influence of the branch gear train.

It is characteristic of one embodiment of this "escapement device" that the ratchet teeth are movable out of the operative reach of the pawl, and the pawl in turn movable out of the operative reach of the ratchet teeth, and that each is thus automatically moved incident to the operation of the control mechanism, as outlined above.

According to still another feature the amount of rake lifting that takes place within a controlled rake lifting cycle, is determined by a time limit switch which permits the cycle to repeat itself for the raking means to be lifted in step-wise fashion and over an aggregate distance at the end of which they are able to cope with the load.

Still other features lie in specific means controlling the automatic function of the ratchet teeth and the pawl with respect to each other.

In a practical embodiment the motor drives the rotary vertical rake shaft until an overload on the sediment impelling elements sets up a driving reaction which operates a switch reversing the motor. In this way, a one-way driving connection between the motor and the raking means is interrupted. By the same token a one-way branch driving connection between the motor and the rake lifting mechanism is being made effective in that a shiftable gear of the branch gear train moves into mesh, causing the actuating nut to rotate and the raking means to rise.

An escapement device locks or releases the actuating nut in the course of a rake lifting cycle by virtue of one or more ratchet teeth connected with the actuating nut, and a stationary pawl engageable therewith. The ratchet teeth move out of reach of the pawl when so controlled by the vertical movement of the rake shaft, and the pawl moves out of the reach of the ratchet teeth when so controlled by the shifting gear of the branch gear train. The movement of the ratchet teeth and of the pawl respectively are so coordinated and controlled that the actuating nut is released for raising the raking shaft, and locked for lowering the same, in the course of a rake lifting cycle. A combination limit-and reversing switch functions at the end of the rake lifting movement to reverse the motor to normal running direction, causing the raking means to be lowered as the normal driving thereof is resumed.

Where the load is heavy, as in the case of the sediment impelling elements getting buried in the sediment, the rakes will lift a distance determined by the time interval of the time limit switch, and the switch will repeat this lifting operation, possibly huntingly, until the aggregate distance of lift is sufficient to cope with the load resistance. Subsequently the accumulation of sediment can be worked down to normal.

The invention possesses other objects and features of advantage, some of which, with the foregoing, will be set forth in the following description. In the following description and in the claims, parts will be identified by specific names for convenience, but they are intended to be as generic in their application to similar parts as the art will permit. In the accompanying drawings there has been illustrated the best embodiment of the invention known to me, but such embodiment is to be regarded as typical only of many possible embodiments, and the invention is not to be limited thereto.

The novel features considered characteristic of my invention are set forth with particularity in the appended claims. The invention itself, however, both as to its organization and its method of operation, together with additional objects and advantages thereof, will best be understood from the following description of a specific embodiment when read in connection with the accompanying drawings in which:

The sediment raking mechanism comprises a vertical rotary rake shaft 10 having sediment raking arms 11 operating in a tank 11a. This vertical rake shaft has rotary driving connection with a worm gear 12 by way of a splined connection 13 (Fig. 4) permitting vertical movement of the rake shaft 10 in the worm gear 12. The upper portion of the shaft 10 has an abutment collar or shoulder 14 which determines the lowermost position of the shaft with respect to the worm gear 12. The rim portion 15 of the worm gear 12 is supported for rotation by way of an annular vertical thrust bearing represented by the anti-friction balls 16 upon an annular casing portion 17 which in turn is shown to be supported upon the settling tank by means of beams 18 and 19. A top or cover portion for the annular casing portion 17 is shown at 20 and it carries within some of the gearing for automatic rake lifting as hereinafter to be described.

The rake shaft 10 has an upper extension in the form of a threaded stem 10a engaged by a nut member 10b the rotation of which will impart vertical axial lifting movement to the rake shaft, thereby raising the rake arms with respect to the sediment in the tank.

The nut member 10b is part of a rake lifting gear train automatically to function in response to certain operating conditions, as hereinafter to be described, and it is cooperatively associated with what is herein to be termed an escapement mechanism also hereinafter to be described and the function of which is to lock or release the nut member 10b under given conditions during the operating cycle of the mechanism.

The worm gear 12 meshes with a worm 21 which is axially slidable upon a worm shaft 22 and against the relatively light pressure of a spring 23. The worm 21 has clutch teeth 24 adapted to engage and normally engaging clutch teeth 25 which are fixed upon the worm shaft 22 by way of a collar 26, the clutch teeth 25 forming part of the collar 26. The clutch teeth are of the one-way driving type, each tooth having a driving face 27 and a sloping or de-clutching face 28.

Figures 2, 3:
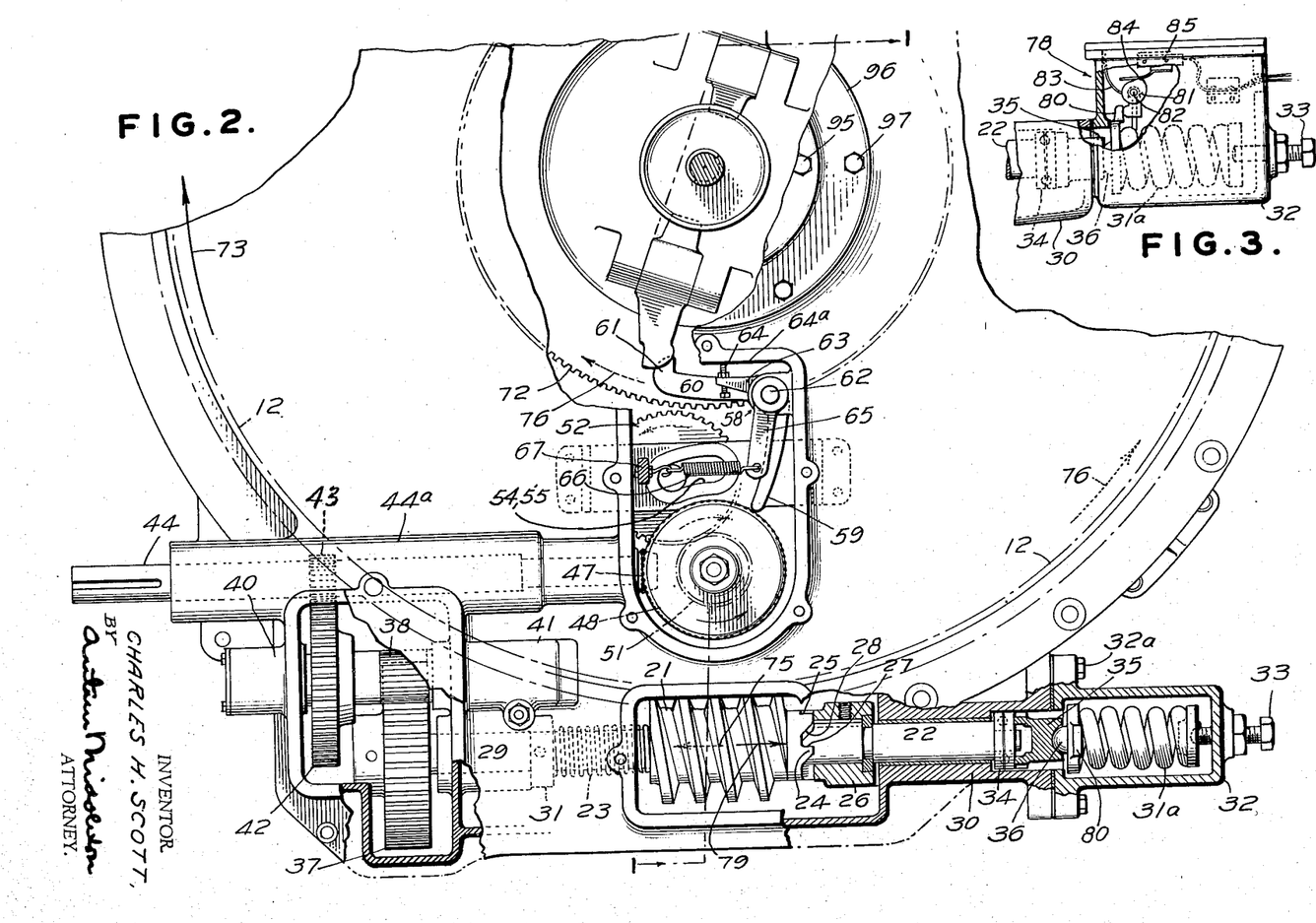
Fig. 2 is a part-sectional plan view enlarged, of the mechanism in Fig. 1, showing the rake driving gear train engaged in accordance with normal raking operation of the machine.
Fig. 3 is a part-sectional elevation of the overload responsive switch arrangement associated with the rake drive, which is responsive to the axial movement of a driving worm shaft.

It will be clear that when the worm shaft 22 rotates in the direction of arrow 37a (see Fig. 12), the clutch teeth 25 of collar 26 will engage the clutch teeth 24 of the worm 21, so that the worm will rotate the worm gear 12 in the direction of arrow 73 (see Fig. 2). If, however, the worm shaft 22 rotates in the direction opposite to the direction of arrow 37a, the worm 21 will disengage itself from the worm shaft as the faces 28 and teeth 24 act as cam faces forcing the teeth 25 and 24 out of engagement with each other, as the worm 21 is thereby moved axially on the worm shaft 22 against the light pressure of spring 23. With the worm 21 thus disengaged from the shaft 22, the worm gear 12 will remain stationary while the worm shaft 22 may continue rotating.

The worm shaft 22 is journaled in the casing portion 17 as at 29 and 30 and axially movable to a limited extent. A thrust collar 31 fixed on the worm shaft 22 determines the limit of axial movement in the direction of the bearing 29. In the opposite direction, namely, towards bearing or journal 30 the axial movement of the worm shaft is restrained by a relatively strong spring 31a housed in a casing portion 32 which is bolted as at 32a to the casing portion 17, the spring pressure being adjustable by means of end thrust screw 33 in the housing portion 32. A ball thrust bearing 34 with thrust bearing member 35 and a semispherical self-adjusting bearing member 36 are interposed between the worm shaft 22 and the restraining spring 31a.

That end of the worm shaft 22, which is opposite the spring-restrained end, has fixed thereto a gear 37 meshing with a pinion 38 on a counter shaft 39 journaled at 40 and 41 in the casing portion 17, and in turn also carrying a gear 42 which meshes with and is driven by another pinion 43 of a shaft 44 (see Fig. 12) which in turn is shown to be chain driven as at 45 from a motor 46, by way of a sprocket 45a on the motor shaft and a sprocket 45b on the free end of shaft 44.

The shaft 44 also drives what shall herein be termed the rake lifting gear train. That is to say the shaft 44 journaled at 44a in the top cover portion 20 has fixed to its free end a small bevel gear 47 meshing with a larger bevel gear 48 rotatable about a vertical axis and mounted for such rotation as at 49 in the top cover portion 20. By way of a vertical shaft 50 or the like the bevel gear rotates together with a gear 51 which in turn meshes with a bodily shiftable idler gear 52.

The idler gear 52 rotates about a vertical axle 53 which in turn may move or float in elongated arcuate openings or bearing slots 54 and 55 provided in an upper and a lower bearing portion 56 and 57 respectively upon and inside the top cover portion 20. In this way the horizontally disposed idler gear 52 is capable of bodily floating movement in a horizontal plane along an arc about the vertical axis of the vertical shaft 50 or of the bevel gear 48 or of the gear 51 (see Figures 2, 5, and 9).

The floating movement of the idler gear 52 influences a latch member 58 which is shown to be in the form of a bell crank member swingable about a vertical axis and also mounted on the inside of the top cover portion 20. This latch or bell crank member 58 has an arm 59 which is adapted to be engaged by the idler gear 52 when the same is in its Fig. 9 position, and it has a latch arm 60 provided with a catch portion 61. The latch member 58 is mounted by way of a vertical shaft 62 and is shown to have fixed with respect thereto a stop arm 63 having a set screw 64 abutting as at 64a against a part of the top cover portion 20, and also to have an arm 65 held by a spring 66 which is anchored as at 67 upon the top cover portion 20 and causes the stop arm 63 or set screw 64 to engage its abutment 64a unless prevented from doing so by the idler gear 52 as in Fig. 9.

The latch- or bell-crank member 58 is part of what is herein termed an escapement device or mechanism which is functionally interposed between the idler gear 52 and the nut member 10b.

It should now be noted that the nut member 10b is fixedly connected with or bolted as at 68 to a cylindrical or skirt portion 69 having at its lower end a flange 70 whereby in turn it is connected with or bolted as at 71 to a gear member 72 of special construction which is rotatably seated by way of an annular thrust ring 72a upon the worm gear 12 and coaxial therewith. This gear member 72 is engageable by the idler gear 52 when the same has assumed its Fig. 9 position, and hence the rake lifting gear train comprising gears 47, 48, 51, 52, 72 (see Fig. 12) is capable of rotating the nut member 10b providing the idler gear 52 is so engaged.

Evidently, when the latch-member 58 is so engaged by the idler gear 52, the latch arm 60 thereof is swung out of the reach of an escapement member or ratchet tooth 77 hereinafter referred to.

Figures 5, 6, 7, 8, 9, 10:
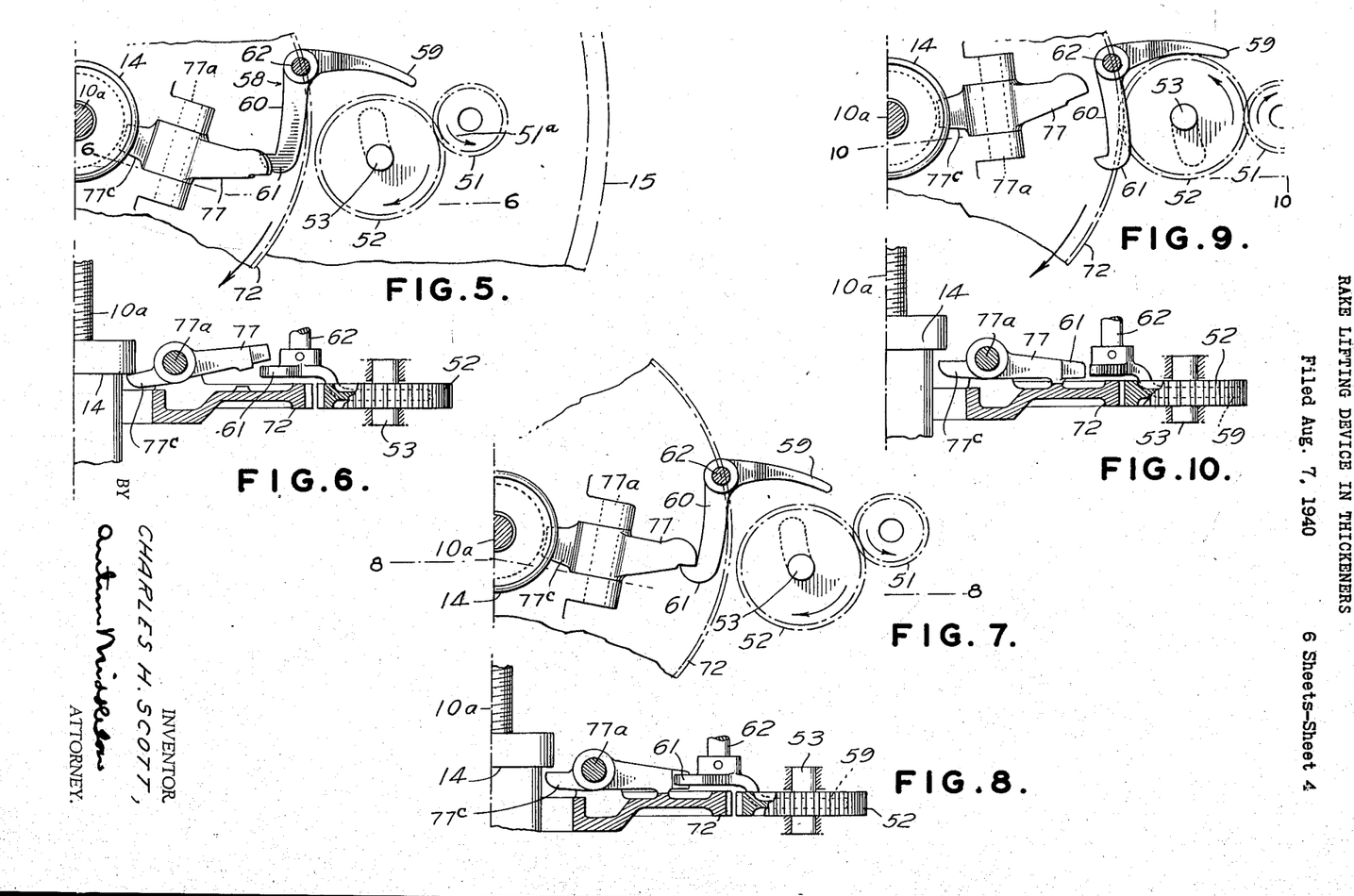
Fig. 5 shows a plan view of the escapement mechanism as contained in Fig. 2, conditioned for normal operation of the thickener drive.
Fig. 6 is an elevational section along line 6—6 in Fig. 5.
Fig. 7 is a view similar to Fig. 5, but showing the escapement mechanism as conditioned during lowering of the thickener rake shaft.
Fig. 8 is an elevational section upon line 8—8 in Fig. 7.
Fig. 9 is another view similar to Fig. 5 or Fig. 7 respectively, but showing the escapement mechanism as conditioned during raising of the thickener rake shaft.
Fig. 10 is an elevational section upon line 10—10 of Fig. 9.
Figure 11:
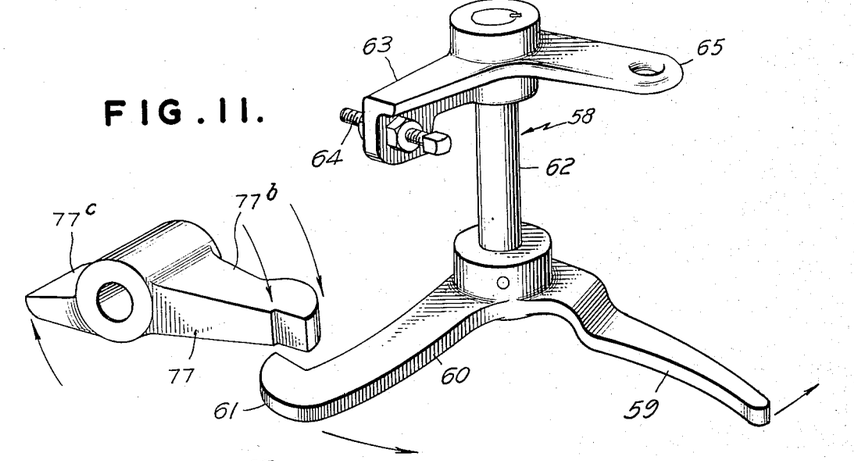
Fig. 11 is a perspective view of characteristic parts of the escapement mechanism shown in the previous figures.
Figure 12:
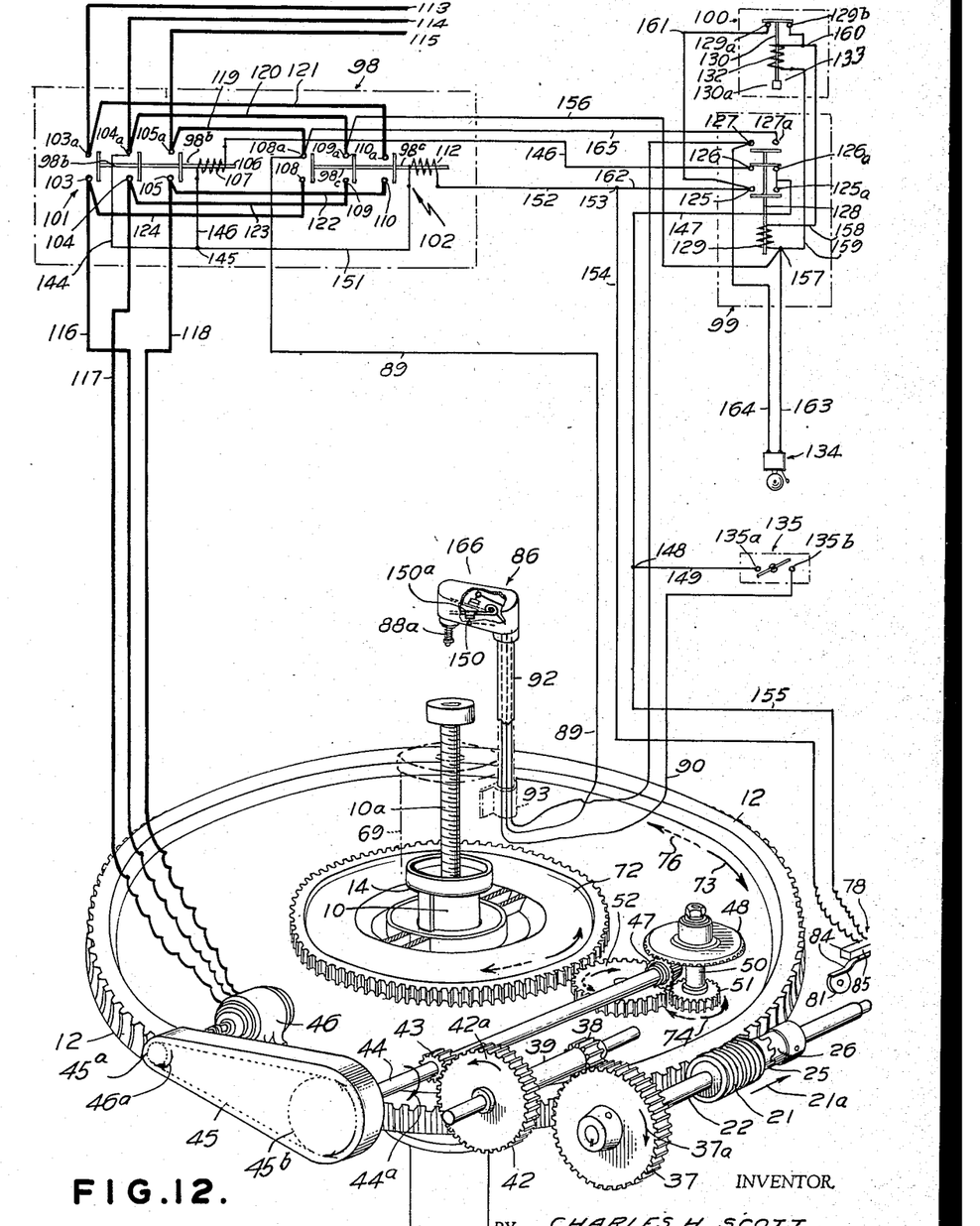
Fig. 12 is a perspective view, somewhat diagrammatic, of the entire drive mechanism and of an electrical system controlling the operating cycle.

Viewing Figs. 2 and 12, it will be understood that incident to one sense of rotation (as indicated by the full line arrows) of the motor and mechanism, the worm 21 will be coupled to the worm shaft 22 by way of the clutch teeth 24 and 25, so as to drive the worm gear 12 in the direction of arrows 73, while at the same time the rotation of the gear 51 in the direction of arrow 74 (see Fig. 12) will tend to bodily move the floating idler gear 52 into the full line position shown in Figs. 2 and 5 and hence away from and out of engagement with the gear member 72. That is to say, incident to the rotation of the drive mechanism in the sense of the full line arrows, the rake shaft 10 is being driven as in normal operation, and the rake lifting gear train between the motor and the nut member 10b becomes automatically interrupted. Under these conditions of rotation it should be noted that the rake shaft 10 is in its lowermost position, and that consequently the gear member 72 and the nut member 10b should rotate together as a unit with the rake shaft 10. Conversely, when the motor and transmission members rotate in the opposite directions, namely, as indicated by the dotted line arrows, the worm 21 will disengage itself from the worm shaft 22 due to the clutch teeth 24 sliding out of engagement with the clutch teeth 25. Such disengagement may occur because the worm gear 12 at this time is practically stationary and the reverse rotation of the worm 21 with respect to the stationary worm gear 12 will cause the worm, so to speak, to screw itself out of engagement with the worm shaft 22, the worm then moving axially in the direction of the dotted arrow 75 until disconnection of clutch 24 and 25 from each other is effected. This means that as a result of such disconnection the worm 21 stops dead, while the worm shaft 22 is free to continue to rotate. This disengagement of the clutch teeth 24 from the clutch teeth 25 is aided because of the sloping faces 28 of the clutch teeth. Under these conditions of rotation, it will also be noted that the tendency, if any, of the worm 21 to rotate the worm gear would be opposite to the normal direction, namely, in the direction of the dotted line arrow 76, which is also opposite to the then rake lifting rotation of the gear member 72 or of the nut member 10b.

There will now be described more completely what has herein been termed the escapement mechanism, a device which in the present organization functions automatically to permit the nut member 10b to rotate with the rake shaft under normal operation, and to permit the nut member 10b to be rotated in the direction of normal rake rotation while the rakes themselves are maintained stationary to cause lifting of the rake shaft, and further to permit the nut member 10b to be held stationary or locked to the gear casing during the descent of the rake shaft 10.

Hence, the escapement mechanism comprises besides the latch member or catch 58 which is movable or swingable in a horizontal plane, an escapement member or ratchet tooth 77 which is movable or swingable in a vertical plane and pivotally mounted as at 77ᵃ on the gear member 72. There are two such escapement members 77 pointing in diametrically opposite directions provided on the gear member 72, and each escapement member 77 in effect represents a ratchet tooth having a front end 77ᵇ and a tail end 77ᶜ, while the latch member 58 correspondingly represents a pawl adapted to engage the ratchet tooth 77. It should be noted, however, that the escapement member or ratchet tooth 77 is vertically movable (see Fig. 6) out of the potential reach of the latch member or pawl 58, and that in turn the latch member or pawl 58 is horizontally movable (see Fig. 9) out of the potential reach of the escapement member or ratchet tooth 77. The proper timing of automatic engagement or non-engagement of the one with respect to the other will permit this escapement device to perform the desired functions with respect to the operation of the rake lifting nut member 10b in the course of an operating cycle more fully to be described.

It will be remembered that, with the embodiment herein illustrated, an automatic operating cycle of the mechanism should take place in response to a certain overload on the rakes. That is to say, the rake drive mechanism should be discontinued by way of having the rake lifting nut 10b establish itself by way of engagement of the floating gear 52 with the gear member 72, all incident to automatic reversal of the motor 46 in response to the overload effect. After the rakes have been lifted a predetermined distance, the rakes should again lower as the normal rake drive connection is re-established by re-engagement of the worm 21, and the drive connection to the nut member 10b or gear member 72 disrupted by way of disengagement of the floating gear 52 from the gear member 72. In case the predetermined distance of rake lifting is insufficient to cope with the load or sediment, a second rake lifting cycle automatically follows the first in order that another such distance of rake lifting be added to the first one, and so on until the rakes have been elevated an aggregate distance sufficient to enable the rakes to cope with the load. The mechanism should stop if and when the aggregate distance of rake lifting required exceeds a given total.

In view of these requirements there is provided on the machine a load responsive switch device 78 (see Fig. 3) associated with the worm shaft 22 to initiate the rake lifting cycle when an excess driving reaction causes axial shifting of the worm shaft 22 in the direction of (full line) arrow 79 against the pressure of the spring 31ᵃ. That is to say, the axial displacement of the worm shaft 22 accordingly displaces the semispherical bearing member 36 (see Fig. 2), causing an arm 80 thereon to rotate a cam element 81 about an axis 82 and against spring pressure 83, to engage the arm 84 of a so-called microswitch or the like 85 which in turn closes a circuit to initiate the rake lifting cycle.

There is further provided on the machine a top limit switch device 86 (see Figs. 4 and 12) which sets the limit for a maximum axial rise of the rake shaft 10. The limit switch proper is a double pole switch, for instance, a double pole micro-switch 87 housed in a casing 88. A push button pin 88ª, if pressed by the rising stem 10ª of the rake shaft 10, will actuate the switch. The switch has a common connector 89 and connectors 90 and 91 respectively for the two poles of the switch. The casing 88 is fixedly supported with respect to the gear casing of the machine by way of a tube member 92 or the like through which the connectors extend, and which in turn is fastened as at 93 to a cylindrical cover portion 94 shown to be bolted as at 95 to an annular member 96 which in turn is bolted at 97 to the top cover portion 20 of the gear casing 17.

The electrical control system for the mechanism furthermore includes (see Fig. 12) a magnetic reversing power switch collectively designated by the numeral 98 whereby the rotation of the motor 46 can be changed from "forward" to "reverse." A switching relay 99, under the influence of the overload switch device 78 effects the reversal of the magnetic reversing power switch 98. A time delay relay switch 100 in turn restores the switching relay 99 which in turn restores the motor 46 from "reverse" to "forward" rotation.

Figures 4, 18:
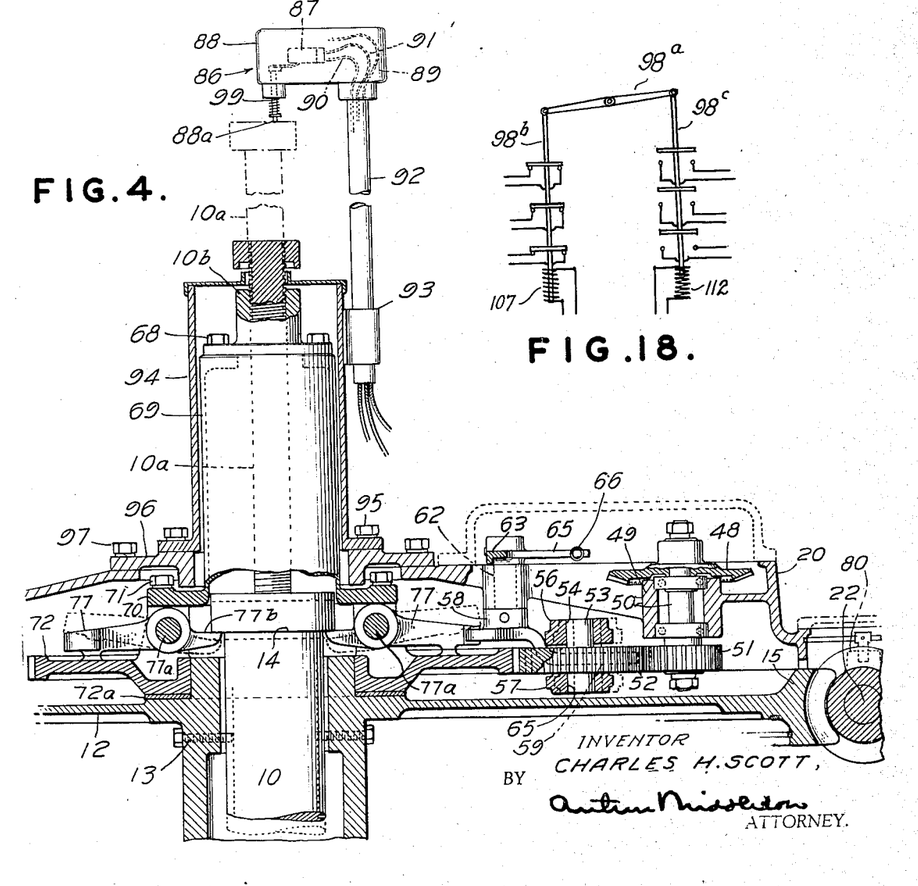
Fig. 4 is an enlarged partial view of Fig. 1, illustrating certain operative conditions of the escapement mechanism.
Fig. 18 is a schematic view of a magnetic reversing power switch.

The magnetic reversing power switch 98 may be of some standard type in which the "forward" and "reverse" sections are mechanically interlocked, so that the one section cannot open unless the other closes and vice versa. This is more clearly illustrated in Fig. 18 showing diagrammatically the construction of such a switch in which a scale beam type lever 98ª mechanically interlocks the "forward" switch member 98ᵇ with the "reverse" switch member 98ᶜ. This power switch comprises a section 101 to establish "forward" rotation of the motor 46, and the section 102 to establish "reverse" rotation. Consequently, the switch section or "forward" switch 101 has three pairs of contact points 103 and 103ª, 104 and 104ª, 105 and 105ª and the switch member 98ᵇ herein called the "forward" switch member, controlled by a "forward" solenoid coil 107 which, when energized, will close the "forward" switch section 101. The switch section or "reverse" switch 102 similarly comprises three pairs of contact points 108 and 108ª, 109 and 109ª, and 110 and 110ª, and the "reverse" switch member 98ᶜ controlled by a "reverse" solenoid coil 112 which, when energized, will close the "reverse" switch section 102.

A three phase power supply 113, 114, 115 leads to the contact points 103ª, 104ª and 105ª respectively. Power connectors or conduits 116, 117, 118 lead from the contact points 103, 104, and 105 respectively to the motor 46. The contact points of the "forward" switch section 101 are wired to the contact points of the "reverse" switch section 102 by a connector 119 between contact points 105ª and 108ª, a connector 120 between contact points 104ª and 109ª, a connector 121 between contact points 103ª and 110ª, and furthermore by connector 122 between contact points 105 and 110, connector 123 between contact points 104 and 109, connector 124 between contact points 103 and 108. The two switch sections 101 and 102 are interlocked so that the one cannot close unless the other opens as illustrated in Fig. 18.

The switching relay or switch relay device 99 comprises three pairs of contact points 125 and 125ª, 126 and 126ª, and 127 and 127ª, and a corresponding contact member 128 controlled by a solenoid coil 129. When the coil 129 is de-energized the contacts 126 and 126ª will be closed, while the contacts 125 and 125ª, and 127 and 127ª will be open. In this condition the relay 99 holds the "forward" section 101 of the power switch 98 closed to run the motor 46 in normal "forward" driving direction. When the coil 129 is energized the contact points 126 and 126ª will be open, while the contact points 125 and 125ª, and 127 and 127ª will be closed. In this condition the relay 99 holds the "reverse" section 102 of the power switch 98 closed, thus effecting reverse rotation of the motor 46.

The time delay relay switch 100, in itself a standard piece of equipment, comprises a pair of contact points 129ª and 129ᵇ, and a corresponding contact member 130 controlled by a solenoid coil 132 which tends to open the switch when energized. However, even though the coil 132 be energized, the opening of the switch 100 is delayed for a predetermined adjustable period by a dash pot 133. As this switch 100 opens at the end of its delay period, it will, through switching relay 99, cause the power switch 98 to be restored from "reverse" to "forward" condition by opening the switch section 102, and closing the section 101 thereof.

There is also provided an alarm bell 134 wired to the switching relay 99, to sound during the delay period of the time delay relay 87, which is the period during which the rake shaft 10 is being raised, as will hereinafter more clearly be described.

There is also provided a start-stop switch 135 which, when closed, remains closed to start the mechanism and keep it running by keeping energized one or the other of the coils 107 and 112 of the power switch 98, and which, when open, remains open and shuts off the power by de-energizing the coils of the power switch 98.

OPERATION

There will now be described (A) the operation of the mechanism or of the mechanical phases constituting what is herein called the rake lifting cycle of the mechanism, and (B) the electrical control system whereby the phases of this operating cycle are automatically controlled, with nothing but a mechanical overload on the rakes to initiate the cycle.

A. *Operation of the mechanism*

The phases of the operating cycle or rake lifting cycle comprise:

(a) Normal operating condition of the mechanism, with rake lifting mechanism disconnected from the drive motor.

(b) Lifting of rakes in response to overload on the rakes, causing reversal of drive motor, disconnection of main drive from and operatively connecting the rake lifting mechanism with the motor.

(c) Stopping the rake lifting movement due to a time limit control in the electrical control system, and again reversing the motor to restore normal driving connection, while disconnecting the rake lifting mechanism.

During normal operation of the thickener rakes 11 the drive motor 46 runs in the direction indicated by the (full line) arrow 46ª (Fig. 12), transmitting its driving power by way of chain 45 to gear 45ᵇ, thus causing the shaft 44 to rotate in the direction of the (full line) arrow 44ª. This causes the pinion 43 on shaft 44 to rotate the gear 42 on countershaft 39 to rotate in the direction of (full line) arrow 42ª, and the pinion 38 on countershaft 39 to cause its companion gear 37 to rotate in the direction of (full line) arrow 37ª. This rotates the worm shaft 22 so as to rotate in turn the worm gear 12 in the direction of (full line) arrow 73, the axial force component in the worm shaft being effective to urge the slidable worm 21 in the direction of (full line) arrow 21ª and thus maintaining driving engagement between the clutch teeth 24 and 25.

Figure 1:
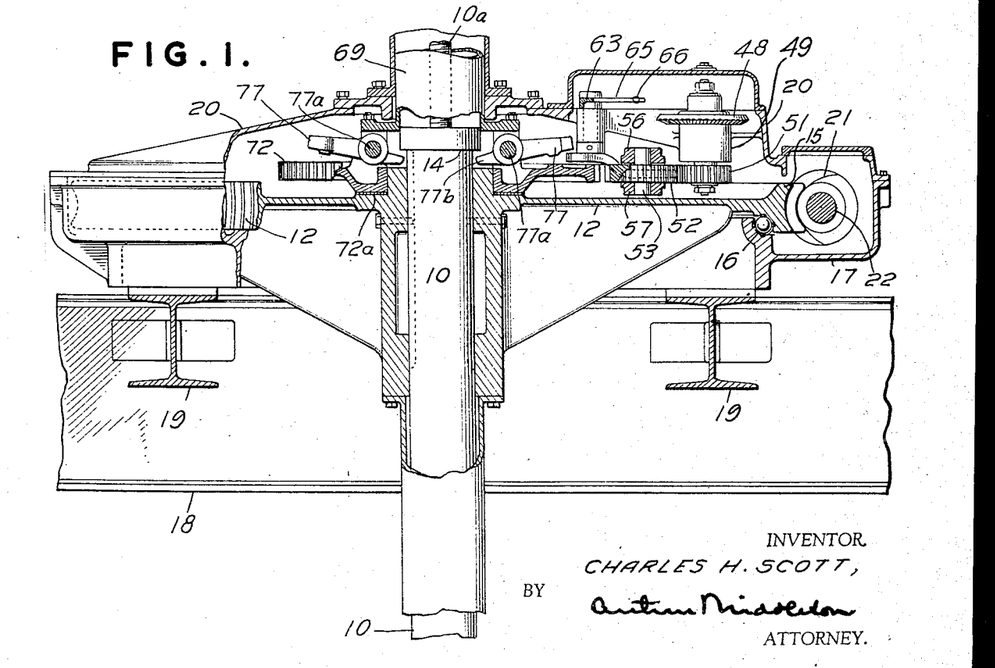
Fig. 1 is an elevational part-sectional view of the drive and rake lifting mechanism, taken along the line 1—1 of Fig. 2, and showing a certain operating condition of the escapement mechanism.

The rake shaft 10 thus turning in clockwise direction causes the nut member 10ᵇ and hence the gear 72 to rotate with it inasmuch as the rake shaft 10 is in its lowermost position and the shoulder 14 thereof (see Figs. 1 and 6) depresses the tail ends 77ᶜ of the ratchet teeth 77, thus lifting the front ends 77ᵇ thereof out of the reach of the latch arm or catch 60 of the latch member 58. It is necessary at this time that the ratchet teeth 77 be thus held removed from the influence of the latch arm 60, because under this normal running condition of the machine the idler gear 52 is out of mesh with the gear 72. That is to say, under this condition the shaft 44 rotates bevel gear 48 and hence gear 51 in the direction of (full line) arrow 51ª (see Fig. 5), thereby urging the idler gear 52 into that end of slots 54 and 55 that corresponds to a disengagement of the idler gear 52 from the gear 72.

When operating normally the rakes 11 in tank 11ª convey sediment down a slightly sloped bottom 11ᵇ and to a central outlet 11ᶜ in the tank bottom. When the rakes 11 encounter undue resistance of a predetermined order, a certain degree of increase in the driving torque of the mechanism will set up sufficient excess axial pressure in the direction 79 (Fig. 2) of the worm shaft 22 to shift the same against the pressure of spring 31ª, so as to close the micro-switch 85 as the arm 80 causes rotation of the cam element 81 which in turn engages the arm 84 of the micro-switch 85 proper. A momentary impulse from the micro-switch influences the electrical system (Fig. 12) to cause reversal of the motor 46 in a manner hereinafter to be described.

As a consequence of such reversal of the driving direction, the worm shaft 22 will at once slide back into its normal axial position, thus releasing the micro-switch 85. The gears of the mechanism start rotating in the opposite direction, namely, in the direction of the respective (dotted line) arrows. The result is that the drive connection between the motor 46 and the gear 12 or rake shaft 10 is interrupted, while a driving connection between the motor 46 and gear 72 or nut member 10ᵇ establishes itself.

In other words, because the gear 12 now becomes stationary the backward rotation of the worm shaft 22 will cause the worm 21 to slide in the direction of (dotted line) arrow 75 (Fig. 2) relative to the worm shaft 22 against the light pressure of spring 23 and out of engagement with the clutch teeth 24. This stops the driving of the worm gear 12 while the worm shaft 22 continues to idle. At the same time, due to the reversal of direction, the idler gear 52 has been bodily shifted into Fig. 9 position in the slots 54 and 55 and hence into mesh and driving engagement with gear 72. Concurrently therewith the shifting of the idler gear 52 engages arm 59 of the latch member 58, thus causing the latch arm 60 to swing out of the reach of the front end 77ᵇ of ratchet teeth 77. This happens preparatory to the raising of rake shaft 10, which now begins as the idler gear 52 actively starts to rotate the gear 72 and thereby the nut member 10ᵇ while the worm gear 12 is held stationary because of the idleness of worm 21. The rotation of the nut member 10ᵇ screws up the threaded stem 10ª and thereby lifts the rake shaft 10. As soon as this begins to happen the collar 14 on the rake shaft releases the tail ends 77ᶜ of the ratchet teeth 77, yet the front ends 77ᵇ thereof cannot be engaged by the latch arm 60 which is held out through the idler gear 52, and so the gear 72 is now free to be rotated independently of worm gear 12.

After the rake shaft 10 has risen a predetermined distance, the electrical system (of Fig. 12) due to a time limit control device therein will automatically function, in a manner hereinafter to be described, to again reverse the motor 46 in order to restore the original operating conditions. This causes the normal driving connection between worm 21 and worm gear 12 to be resumed as the clutch teeth 24 of the worm re-engage the clutch teeth 25 of the worm shaft.

At the same time, due to the resumption of the original driving direction, the idler gear 52 is urged from its Fig. 9 position back to its Fig. 5 position, that is to say, out of engagement with the gear 72. This bodily movement of the idler gear 52 in turn releases the arm 59 of the latch member 58, permitting the spring 66 to bring the latch arm 60 into the reach of the ratchet teeth 77, and (as shown in Figs. 7 and 8) permitting one of the ratchet teeth 77 to be engaged by the latch arm 60. This locks the gear 72 and nut member 10ᵇ in place, and since the worm gear 12 has meanwhile started to rotate, this rotation will cause the rake shaft 10 to be lowered as the threaded stem 10ª screws itself down in the then locked nut member 10ᵇ.

As the rake shaft 10 reaches its lowermost position, the collar 14 thereof will re-engage the tail ends 77ᶜ of the ratchet teeth 77, thus lifting the front end 77ᵇ of the engaged ratchet tooth 77 out of engagement with the latch arm 60, so as to enable the gear 72 and nut member 10ᵇ again to rotate together with the gear 12 when the rake shaft 10 has reached its lowermost position and the rakes 11 have resumed their normal sediment conveying operation.

It should be noted that, with the electrical control system herein provided, each rake lifting cycle is equivalent to a predetermined distance of rake lift. The system responds in such a manner that if a predetermined amount of lift is insufficient to overcome a certain rake resistance, for instance, in case the rakes have become buried or packed in the sediment, the rake lifting cycle will automatically repeat itself and thereby add another such predetermined distance of rake lift to the one just executed. In this way, by automatic repetition of the rake lifting cycle, an aggregate amount of rake lift can be established, which will be sufficient to overcome or work down whatever sediment resistance is encountered by the rakes.

Figs. 13 to 16 show a somewhat modified construction of the escapement mechanism, in that the ratchet teeth are embodied in an annular plate or annulus 137 from which radially extend a number of ratchet teeth, for instance three, designated by numeral 138. The teeth 138 lodge in recesses 139 of the hub portion 140 of a gear 141, the function of which gear corresponds to that of the gear 72 in the disclosures of Figs. 1 to 12. A set of compression coil springs 142, here shown to be three in number, are interposed between the annulus 137 and the gear 141 and tend to press the annulus 137 and the teeth 138 upwardly and away from gear 141 and against an abutment represented by the flanged cylindrical member 94 which is bolted to the hub portion 140 of gear 141, and substantially identical to the element of the same designation in the embodiment of Fig. 4.

The springs 142 tend to press the teeth 138 upwardly and into the reach of a latch arm 143 (see Figs. 15 and 16), constructed similar to the latch arm 60 in Figs. 1 to 12. This condition corresponds to that of the ratchet teeth 77 in Figs. 7 and 8, when the shoulder 14 of the rising rake shaft 10 releases the ratchet teeth.

Figure 13:
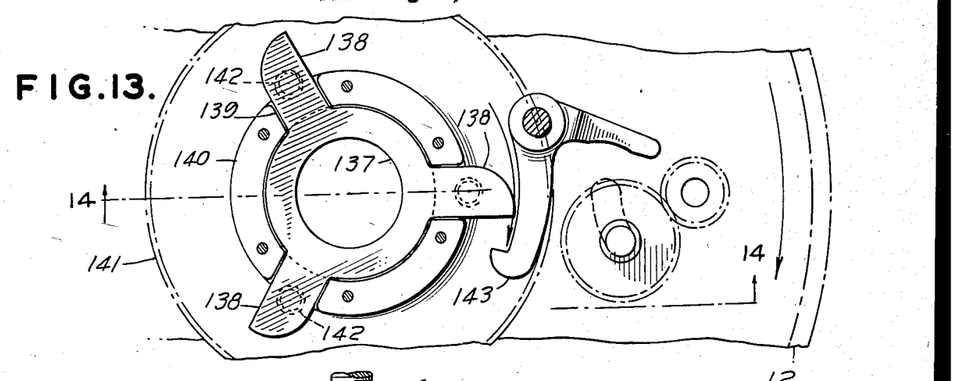
Fig. 13 is a plan view of a somewhat modified form of the escapement mechanism, conditioned for normal operation of the thickener drive mechanism.
Figure 14:
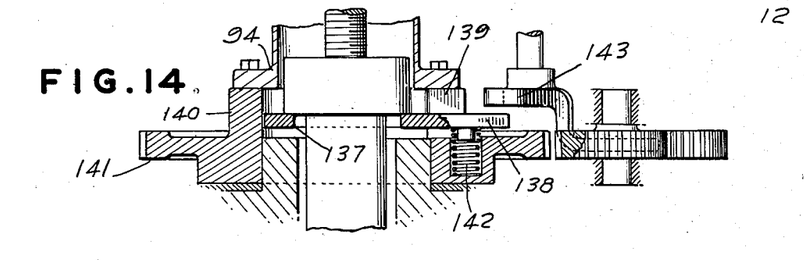
Fig. 14 is a section taken on the line 14—14 in Fig. 13.
Figure 15:
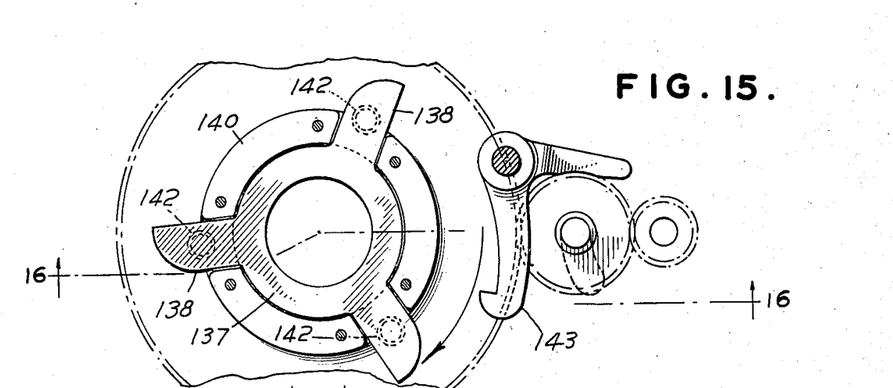
Fig. 15 is a plan view similar to Fig. 13 except that the mechanism is conditioned for rake lifting.
Figure 16:
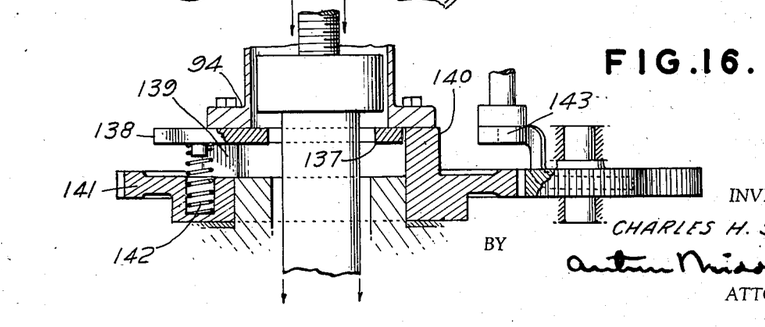
Fig. 16 is a section taken on the line 16—16 in Fig. 15.
Figure 17:
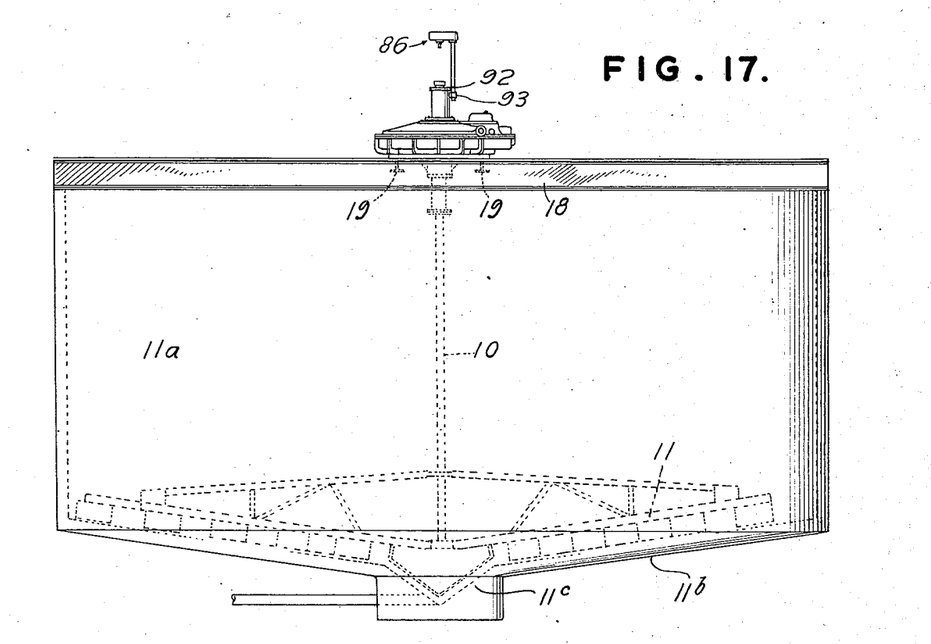
Fig. 17 is a total view of a thickener equipped with mechanism according to this invention, substantially as it appears from the outside.

The condition, according to Figs. 13 and 14, corresponds to that of Figs. 5 and 6, inasmuch as the rake shaft 10 is now in its lowermost position when the shoulder 14 depresses the annulus 137, thus moving the teeth 138 thereof downwardly and out of the sphere of influence of the latch arm 143.

B. *Operation of the electrical control system*

The operation of the electrical system includes the making and breaking of various relay circuits and it comprises the following phases:

(a) Closing the switch relay so as to cause the reversible magnetic power switch to start the drive motor in forward direction for normal operation of the mechanism.

(b) Overload responsive switch to influence the switch relay to reverse the power switch so as to reverse the drive motor to effect rake lifting, while also conditioning a time delay relay which predetermines the amount of rake lift.

(c) Automatically restoring the normal driving condition at the end of the time delay, as time delay relay switch automatically causes the switch relay to reverse the motor to normal driving condition.

Referring to Fig. 12, in order to start the mechanism the start-stop switch 135 is closed by closing the contacts 135$^a$ and 135$^b$ which contacts remain thus closed for the duration of the operation, or until altogether stopping the mechanism. This establishes a relay circuit across one phase of the power supply, namely, between contact points or terminals 104$^a$ and 105$^a$ of the "forward" section 101 of the power switch 98. This circuit will herein be called the "normal running circuit."

This circuit starts from terminal 104$^a$, continues through conductor 144, over point 145, conductor 146 to energize the "forward" holding coil 107 of the power switch to cause the "forward" switch member 98$^b$ thereof to close upon its contact points 103, 103$^a$, 104, 104$^a$, 105, 105$^a$. The circuit passes on through conductor 146, over the closed contact points 126 and 126$^a$ of the switch relay 99, and on through conductor 147, to point 148, through conductor 149, over the closed contact points 135$^a$ and 135$^b$, through conductor 90, over the closed contacts 150 and 150$^a$ of the top limit switch 86, then on through what is herein called the common conductor 89, to point 108$^a$, and finally to terminal 105$^a$ of the power switch. This circuit, by energizing the coil 107, will hold the switch member 98$^b$ closed upon the three pairs of contact points 103 and 103$^a$, 104 and 104$^a$, and 105 and 105$^a$ respectively, and thus supply power from the power phases 113, 114, 115, and through conductors 116, 117, and 118, whereby the motor 46 is rotated so as to drive the gear 12 in the direction of arrow 73.

With this circuit functioning the thickener rakes rotate and operate in normal sediment collecting fashion, as the gears of the mechanism rotate in the respective directions indicated by the full line arrows.

This normal operation is interrupted and a rake-lifting cycle initiated, when an overload of a pre-determined order on the rakes 11 sets up excess driving reaction. This excess reaction in the drive mechanism causes a certain amount of axial displacement of the worm shaft 22, which causes the closing of the overload switch 78. Although of a more or less momentary nature, the closure of the overload switch 78 starts the rake-lifting cycle with the initial result that the drive motor 46 is reversed. This reversal at once stops the rakes 11 and relieves axial driving pressure on the worm shaft 22 and permits it to return to its normal position, so that the overload switch 78 is again opened.

However, this momentary closing of the overload switch 78 suffices to condition the switch relay device 99 as well as the time delay relay 87 in such a manner that the coupled effect of these two devices will cause the reversal of the drive motor 46 for a predetermined time delay period, before automatically restoring it to normal operation.

That is to say, the momentary closing of the overload switch 78 sets up the following circuit or circuits herein to be called the "rake lifting circuits":

From terminal 104$^a$, through conductor 144, to point 145 the circuit is the same as afore-described for the "normal running circuit." At point 145 the circuit branches off in parallel comprising conductor 151 energizing the "reverse" holding coil 112 of the power switch, then continuing through conductor 152, to point 153, through conductor 154, the then closed overload switch 78, and conductor 155 to point 148 where it rejoins the afore-described "normal running circuit," to continue as before through conductor 149, closed start and stop switch 135, conductor 90, contacts 150 and 150$^a$ of top limit switch 86, through common conductor 89, point 108$^a$, and conductor 119, to terminal 105$^a$ of the power switch.

It will be seen that the branch portion of the circuit just described contains mainly the "reverse" holding coil 112 of the power switch. However, there are at this time two further active parallel branches, comprising respectively the holding coil 129 of the switch relay 99, and the holding coil 132 of the time delay relay 100. These two branches are shown to have a common conductor 156 having its origin in terminal 104$^a$ via the conductor 120, and leading to a point 157 where it splits into a branch conductor 158 including the holding coil 129 of the switch relay 99, and into a branch conductor 159 including the holding coil 132 for the time delay relay 100. Both branch conductors join again at point 160 from where they pass over the normally closed time delay switch contacts 129$^a$ and 129$^b$, the contact member 130 having a conventional dash pot whereby the opening is delayed a predetermined period from the time that the holding coil 132 has been energized. Consequently these branches 158 and 159 continue as conductor 161, reaching contact point 125 of the switch relay and continuing through conductor 162 leading to point 153 where it joins the conductor 152, to continue as before through conductor 154, overload switch 78, conductors 155 and 149, closed switch 135, conductors 90, 89, and 119, to terminal 105ª.

The condition just described, however, is only transitional or preparatory to the rake-lifting circuit proper, for the power switch 98 and hence the motor 46 have not as yet been actually reversed. For, the forward holding coil 107 at this time is still energized and, due to the mechanical interlock (see Fig. 18) of the switch members 98ᵇ and 98ᶜ, the "reverse" switch member 98ᶜ cannot yet close although its holding coil 112 is also energized at this time. The actual reversal of the power switch will only take place when the forward holding coil 107 is de-energized. This, however, happens as soon as the switch member 128 of switch relay 99 under the influence of energized coil 129 has shifted into a position in which it breaks contacts 126 and 126ª, while closing contacts 125 and 125ª. Now the motor 46 is actually reversed and the rake-lifting operation takes place in the manner and by mechanism as above described.

The circuit which is thus established for the purpose of the rake-lifting operation, that is to say, the "rake-lifting circuit" proper, is described as follows:

Starting again from terminal 104ª of the power switch the circuit follows conductors 144 and 151, energizes the "reverse" holding coil 112 of the power switch 98, passes through conductors 152 and 162, over the now closed contact points 125 and 125ª of the switch relay 99, conductor 147, point 148, conductor 149, closed start and stop switch 135, conductor 90, closed contacts 150 and 150ª of top limit switch 86, and the common conductor 89 which by way of contact point 108ª and conductor 119 leads to terminal 105ª of the power switch 98.

A parallel branch of the circuit holds in the switch member 128 of the switch relay 99 by reason of the energized coil 129. Another parallel branch, by means of the energized coil 132 tends to open the normally closed contacts 129ª and 129ᵇ of the time delay relay 100, but is prevented from doing so, at least for a predetermined period of energization (herein called the time delay period) by the dash pot 130ª associated with the switch member 130.

The active parallel branches just referred to are described as follows:

Starting again from terminal 104ª of the power switch 98 conductor 120 leads to point 109ª from where conductor 156 leads to point 157, splitting up into conductor 158 containing the coil 129 for the switch member 128 of the switch relay 99, and into conductor 159 containing the coil 132 for the switch member 130 of the time delay relay 100. Conductors 158 and 159 join at point 160, causing the circuit to pass over the still closed contact points 129ª and 129ᵇ of the time delay relay, and through conductor 161 to pass the now closed contact points 125 and 125ª. From here on all parallel branches, namely, those identified by the "reverse" holding coil 112, the switch relay holding coil 129, and the time delay relay holding coil 132, have a common connection leading to the opposite pole (terminal 105ª) described above in the "rake lifting circuit," and also described in the "normal running circuit."

Still another branch circuit is shown for sounding the bell 134 while the rake lifting takes place, and which is as follows:

From terminal 104ª, through conductor 120, contact point 109ª, conductor 156, point 157, conductor 163, bell 134, conductor 164, the now closed contact points 127 and 127ª, conductor 165, contact point 108ª, and conductor 119, to terminal 105ª.

The "rake-lifting circuit" and hence the condition of rake-lifting maintains only for a predetermined period, the time delay period, that is to say, until the energized coil 132 in the time delay relay 100 has forced the switch member 130 away from the contact points 129ª and 129ᵇ against the resistance of the dash pot 130ª. Once these contacts are broken, both the coil 132 of the time delay relay and the coil 129 of the switch relay are at once de-energized, permitting the switch member 128 of the switch relay 99 to fall back and in so doing to break contacts 125 and 125ª while closing contacts 126 and 126ª. This at once de-energizes the "reverse" holding coil 112 and re-energizes the "forward" holding coil 107 of the power switch, thus restoring the "normal running circuit" whereby the motor 46 is again reversed to its normal running condition for normal rotation and operation of the thickener rakes 11. The branch circuit operating the bell 134 during the rake lifting operation will also have been broken with the restoration of the switch member 128 to normal.

It will now be understood that because of the function of the time delay relay 100 each rake-lifting cycle is normally substantially equivalent to a predetermined distance of rake lift, namely, as much as corresponds to the amount of lifting that the machine will do within the time delay period as above defined. It will also be understood that the machine will automatically repeat the rake-lifting cycle as long as excess resistance is encountered by the rakes 11, and that the machine may thus stepwise lift the rakes higher and higher until normal resistance is encountered at which time the rakes will begin to operate normally and to work off the accumulation of sediment.

In case the aggregate distance of rake-lift approaches a predetermined maximum, the top limit switch 86 becomes effective to stop the motor 46, and to sound the bell 134. In that instance the "normal running circuit" is automatically interrupted, and a circuit to sound the bell is substituted.

This condition is created by the threaded stem 10ª of the thickener shaft being lifted to a point where it engages the pin 88ª throwing the double throw switch 89 into the dotted line position whereby a contact between contact point 150 and contact point 166 is established. Thus the disruption of contacts 150 and 150ª breaks the normal running circuit and de-energizes both the "forward" and and the "rearward" holding coils 107 and 112 respectively, and stops the motor 46.

The closing of the contacts 150ª and 166 in turn creates a bell sounding circuit which runs as follows:

From terminal 104ª of the power switch 98, through conductor 120, point 109ª, conductor 156, point 157, conductor 163, bell 134, conductor 164, contact point 127, conductor 91, top limit switch contacts 166 and 150ª, common conductor 89, point 108ª, and then through conductor 119 to terminal 105ª of the power switch.

I claim:

1. Electrically controlled thickener apparatus comprising a tank, rotary sediment-raking means mounted therein, mechanism for driving the same, which mechanism comprises reversible electric drive motor means, a first driving connection between the motor means and the raking means, which connection comprises one-way power transmitting means effective to drive the raking means when the motor means run in forward direction, and to render said connection idle when the driving direction of the motor is reversed, mechanism for lifting the raking means, a second drive connection between the motor means and the lifting mechanism, said connection comprising one-way power transmitting means effective to drive said mechanism to lift the raking means while said motor means run in reversed direction, and effective to interrupt the connection when the forward driving connection of the motor means is restored, a reversing magnetic power switch for the motor means, having a forward magnetic holding coil for the normal forward operation of the motor means and of the rakes, a reverse magnetic holding coil for effecting reverse operation of the motor means and thereby stoppage of the raking means due to the interruption of said first driving connection, and also having mechanically interlocked switch members actuated by said magnetic holding coils whereby one switch member closes when the other opens, and vice versa, an energizable switch relay device for controlling the power switch, said relay device comprising a coil actuated double throw switch member, a pair of forward holding contacts for energizing the forward holding coil of the power switch at one throw of the switch member, and a pair of reverse holding contacts for energizing the reverse holding coil of the power switch at the other throw of the switch member, a coil actuated time delay relay energizable in parallel with said switch relay, and having a pair of time delay contacts normally closed and thus adapted to energize both the power switch relay and the time delay relay, a coil-actuated switch member adapted to open when its coil is energized, and time delay means effective to delay the opening of the switch member for a pre-determined period of energization, said switch member effective to de-energize both the switch relay and the time delay relay, a normally open overload responsive switch, associated with the rake driving mechanism, the rake driving mechanism being so constructed and arranged as to effect the closing of the switch in response to overload on the rakes, and to effect the opening of the switch upon relief of said overload incident to the reversal of the motor means; a first relay circuit to maintain normal rotation of the thickener rakes, and comprising said forward magnetic holding coil of the power switch, and said forward holding contacts then normally closed by said double throw switch member while the reverse magnetic holding contacts are open; a second relay circuit established by the closure of the overload switch preparatory to the operation of the rake-lifting mechanism and in parallel with said first relay circuit, and comprising said reverse magnetic coil of the power switch and said overload switch; a third relay circuit in parallel with said reverse magnetic coil of the power switch, and comprising said time delay relay contacts then closed, and the time delay relay coil; a fourth relay circuit in parallel with the time relay coil, and comprising the switch relay coil; and a fifth circuit effective to reverse the motor means to start the operation of the rake-lifting mechanism after the second, third, and fourth circuits have effected the closing of the reverse holding contacts and the opening of the forward holding contacts of the switch relay and comprising said closed reverse holding contacts in parallel with said overload switch.

2. In combination with a settling tank having rotatable sediment-collecting means comprising a vertical element and sediment-impelling means thereon and rotatable about its vertical axis, said vertical element being axially movable and normally occupying a lower limit position, and adapted for axial upward displacement to relieve overload on the sediment-impelling means, and having associated therewith a threaded portion whereby it can be raised and lowered, a driving and control mechanism which comprises a threaded element rotatably mounted with respect to the tank and substantially confined with respect to axial movement, and adapted to engage said threaded portion and to be rotated for raising the vertical element, a reversible motor, a first drive connection between the motor and the vertical element, comprising a train of driving elements including one way power transmitting means effective to rotate the vertical element when the motor is running in a normal forward direction to drive said vertical element, and to render said driving elements idle when the motor is reversed, a second drive connection between the motor and said threaded element and comprising a train of driving elements including one-way power transmitting means effective to rotate said threaded element and thereby to raise said vertical element when the motor is in reverse, and to render said driving elements inoperative when the motor is running in its normal forward direction, reversing switch means for the motor, main relay means, circuit means connecting the main relay means with the reversing switch means, a torque load responsive switch associated with the first drive connection, and circuit means between said torque load responsive switch and said main relay means for actuating the same, said torque load responsive switch being effective in response to overload on the sediment impelling element to actuate the reversing switch and thereby reverse the driving direction of the motor, causing said vertical element to be raised.

3. Driving and control mechanism according to claim 2, in which the first mentioned drive connection comprises a driven worm shaft, a worm axial slidable and loose upon said worm shaft, a worm gear meshing with said worm, a clutch connection between the worm and the worm shaft, comprising clutch teeth provided on said worm shaft, and companion clutch teeth provided on said worm, said worm being axially slideable in one direction to effect interengagement of said teeth, and slideable in the opposite direction to effect disengagement, said teeth being thus interengaged when the worm shaft rotates in the direction corresponding to the forward running of the motor, said teeth thus being disengaged when the worm shaft runs in the opposite direction corresponding to the reverse running of the motor.

4. Driving and control mechanism according to claim 2, in which the second drive connection, and the one-way power transmitting means therein comprise a train of three gears of which the first gear is geared to the motor, the third gear is geared to said threaded element, and the second gear is intermediate and adapted to mesh with the first and the third gear for rotating said threaded member to raise said vertical element when the motor is running in reverse, and means for mounting said second gear for bodily epicyclic movement between limit positions about the axis of the first gear while in mesh therewith, the second gear being disposed with respect to the first and the third gear in such a manner that the motor running in forward direction moves the second gear out of mesh with the third gear and to the one of said limit positions, and that the motor running in reverse moves said second gear to the opposite limit position and thereby into mesh with said third gear.

5. Driving and control mechanism according to claim 2, with the addition of a pawl having a stationary pivot with respect to the tank, a ratchet tooth connected and rotatable with said threaded member, and adapted to be engaged by said pawl, means for mounting said ratchet tooth for movement into and out of the reach of said pawl, means connected with said vertical element for controlling said movement of the ratchet tooth, whereby the tooth is engaged to be held out of the reach of said pawl when said vertical element is in its lower limit position, and the tooth is released to come within the reach of said pawl while said vertical element is being raised from its lower limit position, means co-operatively associated with and controlled by said last mentioned one-way power transmitting means whereby the pawl is held out of reach of said ratchet tooth while the motor is in its reverse running condition driving the threaded member to raise said vertical element, and whereby the pawl is released to engage the ratchet tooth substantially while the motor is in its forward running condition lowering the vertical element, and means operatively associated with the main relay means to restore said relay means to its inoperative position, whereby the reversing switch is restored to a position effecting a forward running condition of the motor to lower the vertical element.

6. Driving and control mechanism according to claim 2, in which said second drive connection comprises a gear train having a driving gear, an intermediate gear driven by said driving gear and a third gear adapted to be driven by said intermediate gear, in which the first gear is geared up with the motor, the third gear is geared up with said threaded element, means for mounting said second gear for bodily epicyclic movement between limit positions about the axis of the first gear, the second gear being disposed with respect to the first and third gear in such a manner that the motor running in forward direction moves the second gear out of mesh with the third gear and to one of its limit positions, and that the motor running in reverse moves said second gear to its opposite limit position and thus into driving mesh with said third gear, a pawl having a stationary pivot with respect to the tank, a ratchet tooth connected and rotated with said threaded member and adapted to be engaged by said pawl, means for mounting said ratchet tooth for movement into and out of the reach of said pawl, means connected with said vertical element for controlling said movement of the ratchet tooth, whereby the tooth is engaged to be held out of the reach of said pawl when said vertical element is in its lower limit position, and the tooth is released to come within the reach of said pawl while said vertical element is being raised from its lower limit position, a member associated with said pawl and operable to move the pawl into and out of the reach of said ratchet tooth, said intermediate gear being adapted to engage said member to hold the pawl out of the reach of said ratchet tooth when the gear is engaged in driving the threaded member to raise the vertical element, said gear also adapted to release said member to allow the pawl to move into the reach of said ratchet tooth when the gear is in mesh with said third gear, and means operatively associated with the main relay means to restore said relay means to its inoperative position, whereby the reversing switch is restored to a position effecting a forward running condition of the motor to lower the vertical element.

7. Driving and control mechanism according to claim 2, in which said switch control means further comprise a time delay relay means coupled with said main relay means for resetting the latter after a predetermined time delay, to effect resetting of the reversing switch and hence to restore the motor to forward running condition.

8. In a sediment-collecting mechanism for a settling tank having a vertical rotary element and sediment-impelling means thereon, and having associated therewith a threaded portion whereby it can be raised and lowered, said vertical element being adapted for axial displacement to relieve overload on the sediment-impelling means, a device for raising and lowering said vertical element, which comprises a threaded member rotatably mounted with respect to the tank and substantially confined with respect to axial movement, and adapted to engage said threaded portion and to be rotated for raising said vertical element, a motor-driven power-imparting rotary element means for reversing the driving direction thereof, a one-way drive connection comprising a train of three gears of which the first gear is geared to the motor driven rotary element, the third gear is geared to said threaded element, and the second gear is intermediate and adapted to mesh with the first and the third gear for rotating said threaded member, means for mounting the second gear for bodily epicyclic movement between limit positions about the axis of the first gear, said second gear being disposed with respect to the first and the third gear in a manner that the motor driven member running in one direction moves the second gear out of mesh with the third gear and to one of its limit positions, and that the motor driven member running in reverse moves said second gear to its opposite limit position and thus into driving mesh with said third gear, a pawl having a stationary pivot with respect to the tank, a ratchet tooth connected and rotatable with said threaded member, and adapted to be engaged by said pawl, means for mounting said ratchet tooth for movement into and out of the reach of said pawl, means connected with said vertical element for controlling said movement of the ratchet tooth, whereby the tooth is engaged to be held out of the reach of said pawl when said vertical element is in its lower limit position, and said tooth is released to come within the reach of said pawl while said vertical element is being raised from its lower limit position, an actuating member associated with said pawl and operable to move the pawl into and out of the reach of said ratchet tooth, said intermediate gear being adapted to engage said member to hold the pawl out of the reach of said ratchet tooth when the gear is engaged in driving the threaded member raising the vertical element, said gear also adapted to release said member to allow the pawl to move into the reach of said ratchet tooth when the gear is in mesh with said third gear.

9. A device according to claim 8, in which said bodily movable gear rotates about a vertical axis, and is bodily movable in a horizontal plane, and in which said pawl actuating member is an arm connected and co-axially swingable with said pawl, with the addition of spring means for urging said arm towards said gear.

10. In a sediment-collecting mechanism for a settling tank having a vertical rotary element and sediment-impelling means thereon, and having associated therewith a threaded portion whereby it can be raised and lowered, said vertical element being adapted for axial displacement to relieve overload on the sediment-impelling means, a device for raising and lowering said vertical element, which comprises a threaded member rotatably mounted with respect to the tank and substantially confined with respect to axial movement, and adapted to engage said threaded portion and to be rotated for raising said vertical element, a motor driven power-imparting rotary element, a one-way drive connection between said power-imparting element and said vertical element for rotating the same when said power-imparting element rotates in one direction, and inactive when said power-imparting element rotates in the opposite direction, and a second one-way drive connection between said power-imparting element and said threaded member for rotating the same when said power-imparting element rotates in said opposite direction, and inactive when said power-imparting element rotates in said one direction.

CHARLES H. SCOTT.